(12) United States Patent
Boluna

(10) Patent No.: US 7,460,563 B1
(45) Date of Patent: Dec. 2, 2008

(54) DETERMINATION OF INTERLEAVING CHANNELS IN A SERIAL INTERLEAVER

(75) Inventor: Luissergio Boluna, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1079 days.

(21) Appl. No.: 10/234,352

(22) Filed: Aug. 31, 2002

(51) Int. Cl.
*H04J 3/04* (2006.01)

(52) U.S. Cl. ................... 370/535; 370/465; 370/474

(58) Field of Classification Search ............. 370/429, 370/465, 466, 474, 476, 535, 536, 537, 538, 370/540, 542, 543, 544
See application file for complete search history.

(56) References Cited

U.S. PATENT DOCUMENTS

| | | | |
|---|---|---|---|
| 5,414,841 A * | 5/1995 | Bingham et al. | 707/100 |
| 6,310,897 B1 * | 10/2001 | Watanabe et al. | 370/522 |
| 6,757,282 B1 * | 6/2004 | Ofek | 370/389 |
| 6,920,154 B1 * | 7/2005 | Achler | 370/477 |
| 6,931,027 B1 * | 8/2005 | Vogel et al. | 370/477 |
| 6,982,979 B2 * | 1/2006 | Ofek et al. | 370/395.1 |
| 6,985,502 B2 * | 1/2006 | Bunton | 370/535 |
| 7,020,160 B1 * | 3/2006 | Achler | 370/466 |
| 7,092,629 B2 * | 8/2006 | Bunton | 398/8 |
| 7,369,574 B1 * | 5/2008 | Parruck et al. | 370/474 |
| 2002/0034197 A1 * | 3/2002 | Tornetta et al. | 370/535 |
| 2002/0078292 A1 * | 6/2002 | Chilton | 710/305 |
| 2003/0099260 A1 * | 5/2003 | Bunton | 370/535 |
| 2003/0137975 A1 * | 7/2003 | Song et al. | 370/353 |
| 2003/0193972 A1 * | 10/2003 | Pitio | 370/535 |
| 2003/0229844 A1 * | 12/2003 | Bansal et al. | 714/821 |

OTHER PUBLICATIONS

8b/10b Encoder V1.0 Product Specification, LogiCore, Nov. 3, 2000 by Xilinx Inc., 2100 Logic Dr., SJ, CA.
8-bit/10-bit Decoder Data Sheet, Sep. 2001, Tality Corp., SJ, CA.

* cited by examiner

*Primary Examiner*—Chi H. Pham
*Assistant Examiner*—Kevin Mew
(74) *Attorney, Agent, or Firm*—Charles E. Krueger

(57) ABSTRACT

A system and method for determining between serial channels received in an interleaved serial data stream. Each channel includes only a single version of a delimiting character so that the channels can be uniquely determined.

9 Claims, 4 Drawing Sheets

DETERMINATION OF INTERLEAVING CHANNELS IN A SERIAL INTERLEAVER

BACKGROUND OF THE INVENTION

Many devices, such as routers, use switched crossbars that operate at high data rates. These crossbars utilize serial links to transmit data in serial format. SerDes (Serializer/Deserializer) units are required to convert between parallel data processed by line cards and the serial data transmitted on the backplane. For high speed serial links the SerDes unit uses a serial interleaver that interleaves two serial data streams having the same data rate (for example, running at 3.125 Gb/s each) into a single serial data stream running at twice the data rate (for example, 6.125 Gb/s). This allows full utilization of the high-speed serial link with devices that provide data at lower speed.

Many SerDes units use 8b/10b encoding which is ideally suited for high-speed serial data links. The code scheme is DC-balanced which is beneficial to allow threshold setting and equalization. Also, the code ensures a limited run length, no more than five consecutive ones or zeros, and a guaranteed transition density, which facilitates clock recovery from the data stream.

A special set of K characters are used to delimit packets. A subset of K characters, known as commas, are unique in that their bit pattern never occurs in a string of serialized data symbols so that the commas can be used to determine symbol boundaries at the receiving end.

The 8b/10b encoding format encodes 8-bit input data into 10-bit symbols for transmission. The 8-bit blocks are partitioned into 5-bit and 3-bit sub-blocks which are respectively encoded into 6-bit and 4-bit sub-blocks. A prefix of D or K is used to distinguish between data and special characters. A symbol is named by its prefix and the decimal values of its sub-blocks. For example, D31.1 is a data symbol having a first sub-block of (1111) which has a decimal value of 31 and a second sub-block of (100) having a decimal value of 1. Note that the LSB is on the left.

The disparity of a block of data is defined as the difference between the number of ones and zeros in the block. A positive disparity reflects the excess of 1s over 0s. Each symbol may be encoded in two ways; a primary encoding with a positive disparity and an alternate encoding with a negative disparity. The encoder selects the disparity of the symbol to maintain a running disparity value between +1 and −1 to achieve the goals of maintaining transition density and limited run lengths.

In all SerDes units, after individual bit alignment has been established, the beginning and ending of each symbol being transmitted in a serial data stream must be determined because byte boundaries associated with the parallel data are lost during serialization. Accordingly, as described above, most SerDes units send a series of special characters known as commas.

All of these commas are unique characters within the 8B/10B code that begin with either a 1100000XXX or 0011111XXX, depending on disparity and individual K character rules. These versions are called primary (positive disparity) and alternate (negative disparity) versions. These commas are sent in a predetermined fashion so that the clock recovery unit can locate the boundaries of the symbols being transmitted by a SerDes unit.

The K characters that include commas are K28.1, K28.5, and K28.7. As described above these K characters are transmitted as positive or negative disparity versions depending on the running disparity.

For existing serial interleavers, there is no correlation between the input channels and the output channels. Thus, if serial channel A and B are interleaved each of the received de-interleaved channels has an equal probability of being serial channel A or serial channel B.

Currently, there is no simple solution to distinguish between the two streams originally interleaved after the receive end de-interleaves them.

BRIEF SUMMARY OF THE INVENTION

In a first embodiment of the invention, a method for distinguishing between interleaved bit streams uses an encoding scheme that utilizes different symbol delimiting characters for the bit streams to identify the bit streams.

In another embodiment of the invention, commas having a primary disparity are inserted into a first serial channel to delimit words and commas having an alternate disparity are inserted into a second serial channel to delimit words.

In another embodiment of the invention, the disparity of commas detected in a de-interleaved channel are indicated to determine the channel.

Other features and advantages of the invention will be apparent in view of the following detailed description and appended claims.

DETAILED DESCRIPTION OF THE INVENTION

Figure 1:
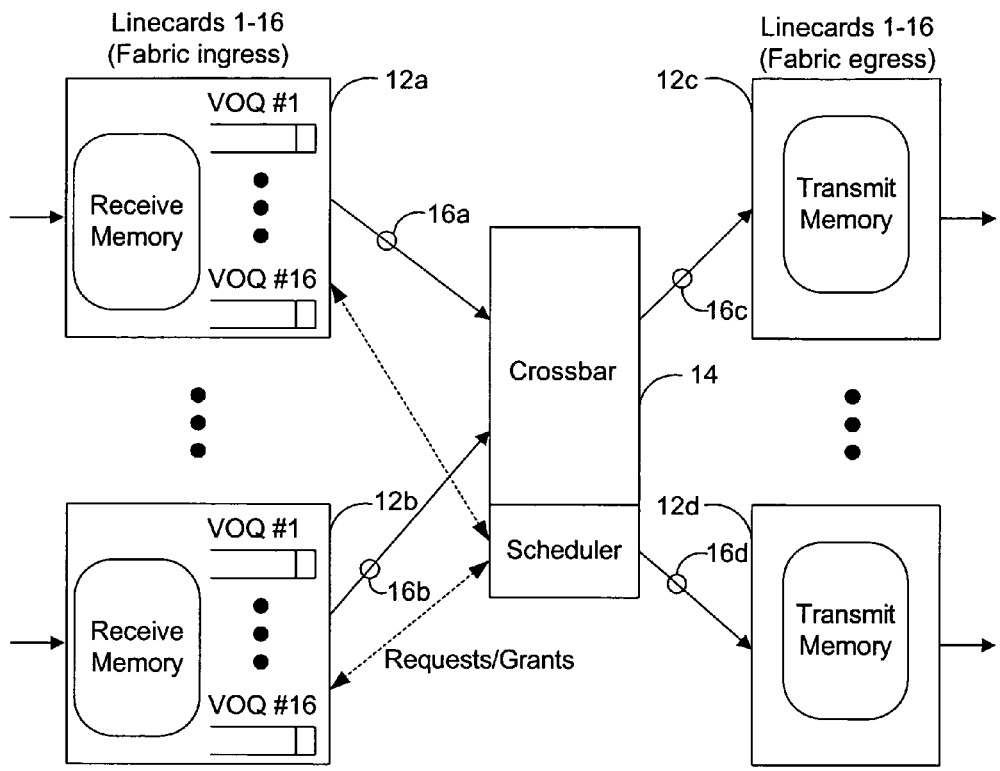
FIG. 1 is a block diagram of a non-blocking router architecture utilizing a crossbar.

The invention will now be described with reference to specific embodiments by way of example not limitation. In the drawings like or similar parts in different views have the same reference number. In the following an embodiment will be described which is utilized in a router. However, it will be apparent that the invention has general utility in many other environments.

For example embodiments of the invention could be utilized over transmission media, other than a backplane, such as cable, optical fibers, and wireless. Further, although one advantage of the invention, as described above, is to allow interleaving of slower channels into a faster channel, such as interleaving two 3.25 Gb/s channels onto a 6.5 Gb/s channel, embodiments of the invention are also useful in existing systems using 1.25 or 2.5 Gb/s channels or operating at any other speed.

FIG. 1 is a high level depiction of a router 10 depicting line cards 12 connected to a crossbar switch 14 by serial links 16. The crossbar includes crossbar switches in the form of ASICs coupled to a backplane formed of multiple serial links.

Modern routers are highly modular and include a chassis having multiple slots for inserting cards to perform selected functions. Line cards connect the router to other devices via electrical or optical media. The switch fabric, in this embodiment, includes switch-fabric cards and scheduler cards.

Figure 2:
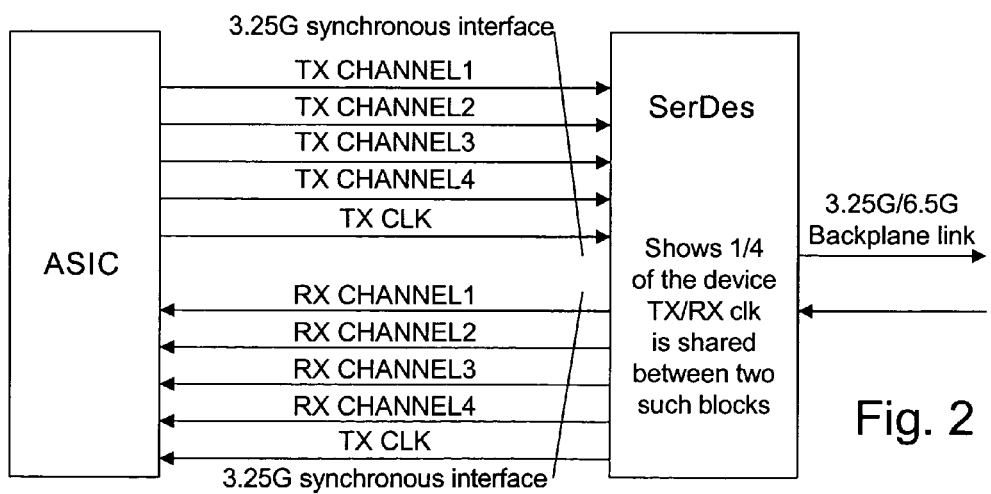
FIG. 2 is a block diagram of a SerDes interface to the backplane and ASICs.

FIG. 2 is a block diagram depicting a SerDes interface to the ASICs and the backplane. The ASIC is coupled to the SerDes by 3.25 Gb/sec transmit (Tx) and receive (Rx) parallel channels. The SerDes converts the parallel data streams received on the parallel channels to a serial data stream and converts a received serial data stream into parallel data streams as is known in the art.

Each card connected to a serial link includes a SerDes unit for transforming data between serial and parallel formats. As depicted in FIG. 2, in this embodiment a SerDes operating a 6.5 Gb/sec data rate is utilized. Each ASIC is connected to the SerDes by multiple parallel 3.25 Gb/sec channels.

Figure 3:
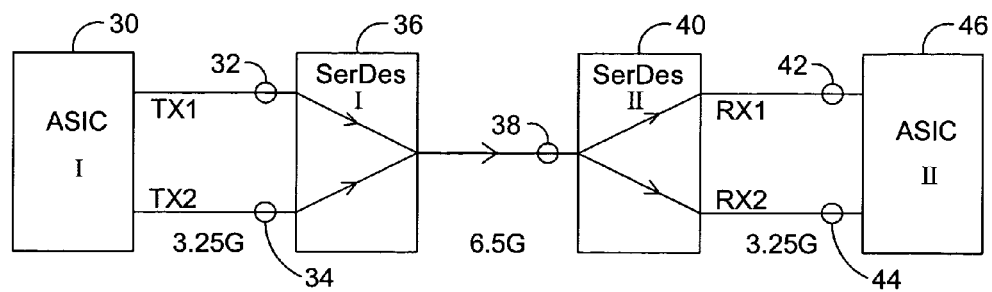
FIG. 3 is a block diagram of a SerDes interface to the backplane and ASICs depicting two parallel channels.

FIG. 3 depicts a first ASIC 30 coupled by first and second 3.25 Gb/sec parallel Tx channels 32 and 34 to a first SerDes 36. The first SerDes 32 interleaves the first and second parallel Tx channels onto a 6.5 Gb/sec serial channel 38 which can be part of the backplane. A second SerDes 40 receives the data on the serial channel 38 and de-interleaves the data onto second and third 3.25 Gb/sec Rx parallel channels 42 and 44 coupled to a second ASIC 46.

Figure 4:
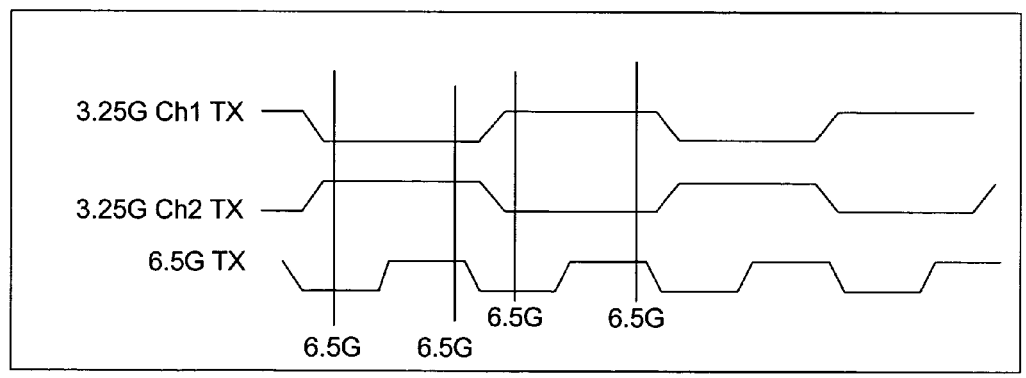
FIG. 4 is a timing diagram of the standard operation of the system depicted in FIG. 2.

The bit values on the first and second parallel Tx channels 42 and 44 and the serial channel 38 are depicted in FIG. 4. The bits are sampled (the sampling clock is indicated by vertical lines) at 6.5 Gb/sec and interleaved for transmission on the serial channel by the first SerDes 36.

The interleaving of the serial channels can be performed in different ways. For example, original serial data streams to be interleaved are called $A_0A_1A_2A_3A_4A_5A_6A_7A_8A_9$ and $B_0B_1B_2B_3B_4B_5B_6B_7B_8B_9$ where it is assumed that the serial side SerDes is 10 bits long. Other patterns are possible and the order of serialization, i.e., whether $bit_0$ is the MSB or LSB is not critical to the operation of this embodiment. Two examples of how the bits can be interleaved are:

$A_0A_1A_2A_3A_4A_5A_6A_7A_8A_9B_0B_1B_2B_3B_4B_5B_6B_7B_8B_9$ or
$A_0B_0A_1B_1A_2B_2A_3B_3A_4B_4A_5B_5A_6B_6A_7B_7A_8 B_9A_9B_9$.

The interleaved channels are sampled at 6.5 G/bit/sec by the second SerDes 46 and de-interleaved. FIG. 4 only depicts transmission from the first to the second ASIC. However, transmission in the other direction is similarly implemented. As depicted in FIG. 4, the 6.5 Gb/sec interleaved serial data stream is generated by bit interleaving Tx1 and Tx2 to one 6.5 Gb/sec channel.

Subsequent to de-interleaving, the serial channels are processed by comma detection circuits to detect commas and align the received serial data back to its original byte boundary. It is important to note that in standard systems the comma can either be the primary comma or the alternate comma depending on running disparity.

In standard systems the identity of the de-interleaved serial channels cannot be easily determined. An embodiment of the present invention will now be described, with reference to the block diagram of FIG. 5 and the flow chart of FIG. 6, that provides a technique for identifying the de-interleaved serial channels that can be efficiently implemented in software.

In this example, as depicted in FIG. 4, channel A and channel B are to be interleaved and sent to a serial bit de-interleaver. The method used to determine between two channels input to a serial bit interleaver is to send on channel A the K character coded as primary (e.g., the primary or positive disparity version of K28.5 or K28.7) and to send on channel B the K character coded as alternate (e.g., the alternate or negative disparity version of K28.5 or K28.7).

Figure 5:
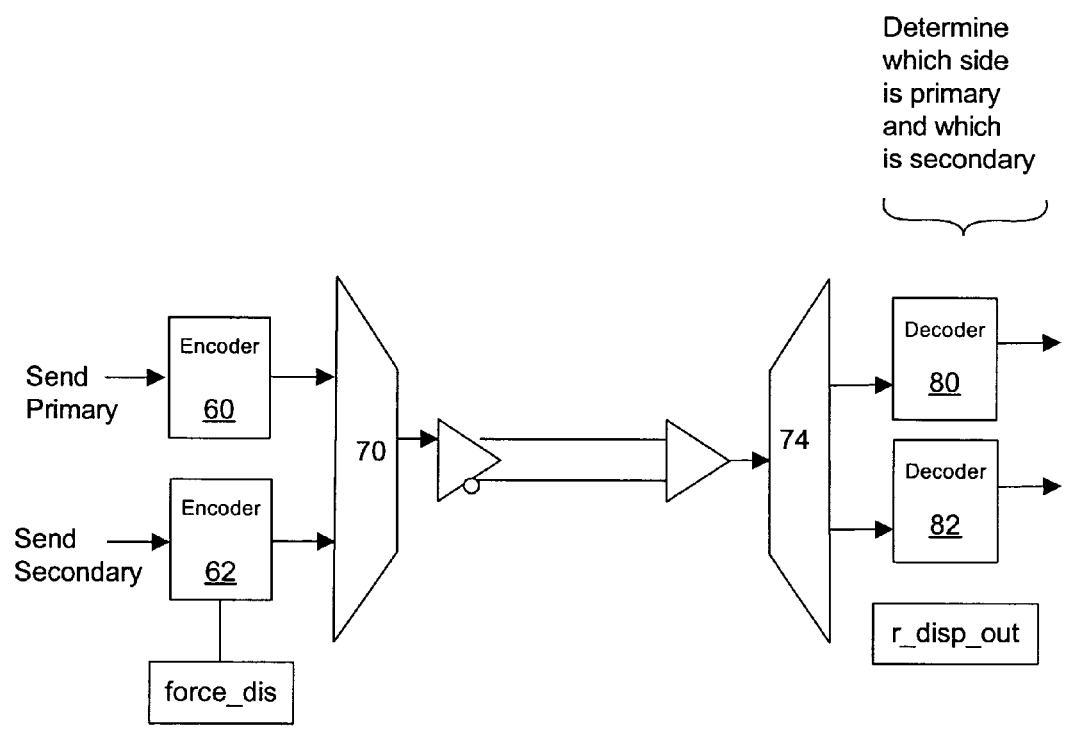
FIG. 5 is a block diagram of an encoder/decoder for implementing an embodiment of the invention.
Figure 6:
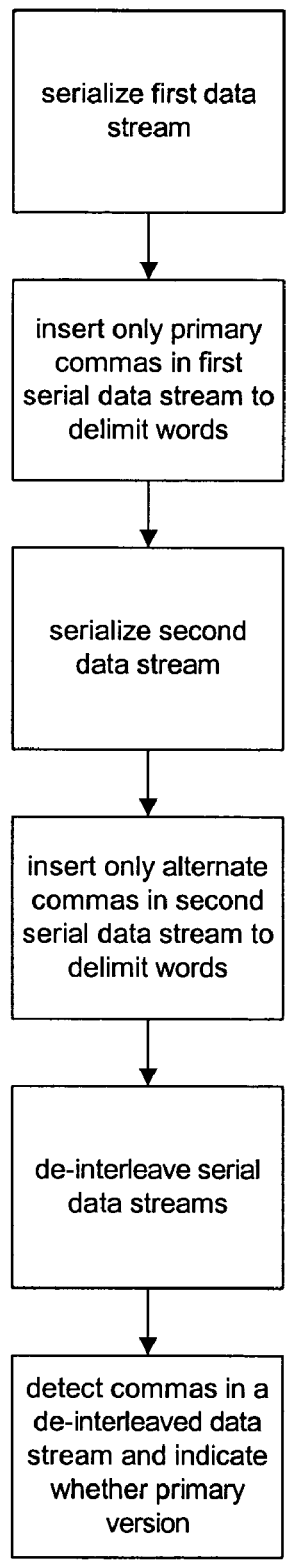
FIG. 6 is a flow chart depicting the acts performed by an embodiment of the invention.

Referring first to FIG. 5, first and second encoders 60 and 62 for serializing the first and second channels prior to interleaving are depicted. As described above, commas are inserted into the serial data stream to delimit the byte boundaries. The first encoder 60 functions to insert the primary character as a symbol delimiter for every symbol in the first serial data stream and the second encoder 62 functions to insert the secondary character as a symbol delimiter for every symbol in the second serial data stream data. In the case where 8b/10b encoding is used the primary character would be the comma having a first disparity and the secondary character would be a comma having a second disparity.

Thus, in the encoding circuitry the comma version for delimiting symbols in the first serial data stream is forced to the primary version for each encoded symbol. The encoder maintains the running disparity by using primary or alternate versions of non-comma K and D characters. Similarly, the commas inserted into the second serial data stream are forced to the alternate version.

The first and second serial data streams are then transmitted to a serial interleaver 70 which interleaves the serial data streams and transmits them over a medium 72. A serial de-interleaver 74 receives the interleaved data stream, de-interleaves it, and outputs the first and second serial data streams, respectively, to first and second decoders 80 and 82. The decoders indicate whether the primary or secondary version has been used as a symbol delimiter thereby unambiguously indicating the identity of the de-interleaved serial data stream.

The invention may be implemented in various manners. A software embodiment will now be described. As depicted in FIG. 5, the encoders 60 and 62 have a force disparity input which can be set by software to force the version of the symbol delimiters to either the primary or secondary character. Thus, the software can tag the first and second serial data streams by inserting symbol delimiters having different disparity.

Additionally, the decoders 80 and 82 have disparity outputs which can be monitored by software to determine the disparity of the symbol delimiters decoded at each decoder and to unambiguously determine the identity of the received serial data streams.

The software can be executed by the interfaces depicted in FIG. 2 and works for either of the interleaving patterns described above because the control is applied at the decoded side of the interface, as depicted in FIG. 5, not at the high-speed serialized side of the SerDes.

Alternatively, the logic of the decoder itself could be slightly modified to indicate the disparity of the comma. Regardless of what type of CDR (clock and data recovery) scheme or architecture is used, ten bits must be located within a serial stream prior to being decoded back to 8 bits. This is done by using the fact that a comma will be 11 00000 xxx or 00 11111 xxx. So a typical solution is to XOR two consecutive bits followed by XOR of 5 consecutive bits to look for this.

A minor addition to this logic could be used to determine if the bits being XORed are a one or zero. This, in turn, can be used in a combinatorial logic circuit to send a signal that flags if the comma is primary or alternate. Software can then interpret this signal.

The invention has now been described with reference to various embodiments. Alternatives and substitutions will now be apparent to persons of skill in the art. In particular, the invention has been described with reference to embodiments utilizing 8b/10b encoding. However, as would be apparent to persons of skill in the art, the invention is applicable to any encoding scheme having primary and alternate forms of a word delimiting character or any serial bit coding length. Thus, if some other bit code case or serial bit length is used, the invention is applicable to a similar comma-like character that would be utilized for that code case. Accordingly, it is not intended to limit the invention except as provided by the appended claims.

What is claimed is:

1. A method comprising:
    encoding a special symbol delimiting character to be inserted between symbols in a first serial data stream as a primary character version of the special symbol delimiting character, where the special symbol delimiting character has a primary character version and an alternate character version and where the special symbol delimiting character versions are utilized to delimit symbol boundaries in a data stream;
    inserting the primary character version of the special symbol delimiting character between symbols in the first serial data stream to form a first source serial channel;
    encoding the special symbol delimiting character to be inserted between symbols in a second serial data stream as the alternate character version of the special symbol delimiting character;
    inserting the alternate character version of the special symbol delimiting character between symbols in the second serial data stream to form a second source serial channel;
    interleaving the first and second source serial channels into a single interleaved serial channel;
    maintaining running disparity of the interleaved serial channel by using primary or alternate versions of other symbol delimiting characters inserted into the interleaved serial channel;
    de-interleaving the interleaved serial channel to recover first and second received serial channels where the first received serial channel is either the first or second source serial channel;
    detecting the special symbol delimiting characters in the first received serial channel; and
    determining whether the first received serial channel is the first or second source serial channel based on whether the special symbol delimiting character inserted between symbols in the first received serial channel is encoded as the primary or alternate character version of the special symbol delimiting character.

2. The method of claim 1 where the first and second source serial channels are encoded in the 8b/10b format and where the step of encoding each special symbol delimiting character includes the steps of:
    encoding the special symbol delimiting character to be inserted between symbols in the first serial data stream as a comma with a first disparity; and
    encoding the special symbol delimiting character to be inserted between symbols in the second serial data stream as a comma with a second disparity.

3. A system comprising:
    an interleaver configured to interleave first and second source serial channels into an interleaved serial channel, with symbols in the first and second source serial channels delimited by a special symbol delimiting character encoded either as a primary or alternate character version of the special symbol delimiting character and where the special symbol delimiting character versions are utilized to delimit symbol boundaries in a data stream;
    an encoding unit, coupled to an input of the interleaver, configured to insert special symbol delimiting characters into a first and second serial data stream to delimit symbols to form first and second source serial channels, to encode the special symbol delimiting character inserted between symbols in the first serial data stream as the primary character version of the special symbol delimiting character, to encode the special symbol delimiting character inserted between symbols in the second serial data stream as the alternate character version of the special symbol delimiting character, and to maintain running disparity of the interleaved serial channel by using primary or alternate versions of other symbol delimiting characters inserted into the interleaved serial channel;
    a de-interleaver configured to de-interleave the interleaved serial channel to form first and second received serial channels;
    a decoding unit, coupled to receive the first received serial channel, configured to decode the special symbol delimiting characters in the first received serial channel and to indicate whether the special symbol delimiting characters are encoded as the primary or alternate character version of the special symbol delimiting character; and
    an interface configured to examine a decoded special symbol delimiting character in the first received serial channel to determine the identity of the received serial channels.

4. The system of claim 3 where the encoding unit further comprises:
    an input for receiving a first signal controlling whether the symbol delimiting character inserted into a serial data stream is the primary character version or the alternate character version of the special symbol delimiting character; and
    where the decoding unit further comprises:
    an output for outputting a second signal indicating whether the symbol delimiting character in the received serial channel is the primary character version or the alternate character version of the special symbol delimiting character.

5. The system of claim 4 where:
    said interface is further configured to execute software to output said first signal and to control the first signal to indicate the version of the special symbol delimiting character to be inserted between symbols in the serial data streams to tag the source data streams and to monitor the second signal to determine the identity of the received serial channels.

6. A system comprising:
    means for encoding a special symbol delimiting character to be inserted between symbols in a first serial data stream as a primary character version of the special symbol delimiting character, where the special symbol delimiting character has a primary character version and an alternate character version and where the special symbol delimiting character versions are utilized to delimit symbol boundaries in a data stream;
    means for inserting the primary character version of the special symbol delimiting character between symbols in the first serial data stream to form a first source serial channel;
    means for encoding the special symbol delimiting character to be inserted between symbols in a second serial data stream as the alternate character version of the special symbol delimiting character;
    means for inserting the alternate character version of the special symbol delimiting character between symbols in the second serial data stream to form a second source serial channel;
    means for interleaving the first and second source serial channels into a single interleaved serial channel;

means for maintaining running disparity of the interleaved serial channel by using primary or alternate versions of other symbol delimiting characters inserted into the interleaved serial channel means for de-interleaving the interleaved serial channel to recover first and second received serial channels where the first received serial channel is either the first or second source serial channel:

means for detecting the special symbol delimiting characters in the first received serial channel; and means for determining whether the first received serial channel is the first or second source serial channel based on whether the special symbol delimiting character inserted between symbols in the first received serial channel is encoded as the primary or alternate character version of the special symbol delimiting character.

7. The system of claim 6 where the first and second source serial channels are encoded in the 8b/10b format and where the means for encoding each special symbol delimiting character includes:

means for encoding the special symbol delimiting character to be inserted between symbols in the first serial data stream as a comma with a first disparity; and means for encoding the special symbol delimiting character to be inserted between symbols in the second data stream as a comma with a second disparity.

8. A method comprising:

encoding a special symbol delimiting character to be inserted between symbols in a first serial data stream as a primary character version of the special symbol delimiting character, where the special symbol delimiting character has a primary character version and an alternate character version and where the special symbol delimiter character versions are utilized to delimit symbol boundaries in a data stream;

inserting the primary character version of the special symbol delimiting character between symbols in the first data stream to form a first source serial channel;

encoding the special symbol delimiting character to be inserted between symbols in a second serial data stream as the alternate character version of the special symbol delimiting character;

inserting the alternate character version of the special symbol delimiting character between symbols in the second serial data stream to form a second source serial channel;

interleaving the first and second source serial channels into a single interleaved serial channel where the character versions of the special symbol delimiting characters inserted into the first and second source serial channels enable the channels to be distinguished when de-interleaved; and maintaining running disparity of the interleaved serial channel by using primary or alternate versions of other symbol delimiting characters inserted into the interleaved serial channel.

9. A method comprising:

de-interleaving a received interleaved serial channel to recover first and second received serial channels, where the first received serial channel is either a first or second source serial channel, with symbols in the first received serial channel delimited by a special symbol delimiting character encoded as either a primary or alternate character version, where the special symbol delimiting character versions are utilized to delimit symbol boundaries in a data stream and with the first source serial channel including only the primary character version of the special symbol delimiting character and the second source serial channel including only the alternate version of the special symbol delimiting character;

detecting the special symbol delimiting characters in the first received serial channel; and determining whether the first received serial channel is the first or second source serial channel based on whether the special symbol delimiting character inserted between symbols in the first received serial channel is encoded as the primary or alternate character version of the special symbol delimiting character.

\* \* \* \* \*